(12) United States Patent
Chipchase

(10) Patent No.: US 7,174,516 B2
(45) Date of Patent: Feb. 6, 2007

(54) COMMUNICATION LOG FOR AN ELECTRONIC DEVICE

(75) Inventor: Jan Chipchase, Tokyo (JP)

(73) Assignee: Nokia Corporation, Espoo (FI)

( * ) Notice: Subject to any disclaimer, the term of this patent is extended or adjusted under 35 U.S.C. 154(b) by 645 days.

(21) Appl. No.: 10/318,317

(22) Filed: Dec. 12, 2002

(65) Prior Publication Data
US 2003/0225879 A1    Dec. 4, 2003

(51) Int. Cl.
G06F 3/00 (2006.01)
G06F 9/00 (2006.01)
G06F 17/00 (2006.01)

(52) U.S. Cl. .................. 715/763; 715/834; 345/440; 345/441

(58) Field of Classification Search ............ 715/751, 715/752, 753, 963, 834, 763, 762; 345/440, 345/440.1, 441
See application file for complete search history.

(56) References Cited

U.S. PATENT DOCUMENTS

| | | | | |
|---|---|---|---|---|
| 5,581,678 A | * | 12/1996 | Kahn | 345/440 |
| 5,898,431 A | * | 4/1999 | Webster et al. | 715/841 |
| 5,982,383 A | * | 11/1999 | Kumar et al. | 345/440 |
| 6,239,801 B1 | * | 5/2001 | Chiu et al. | 715/500.1 |
| 6,332,147 B1 | * | 12/2001 | Moran et al. | 715/500.1 |
| 6,828,989 B2 | * | 12/2004 | Cortright | 715/769 |
| 6,876,732 B2 | * | 4/2005 | Ebisawa et al. | 379/156 |
| 6,920,445 B2 | * | 7/2005 | Bae | 707/2 |
| 6,993,723 B1 | * | 1/2006 | Danielsen et al. | 715/751 |
| 2002/0054040 A1 | * | 5/2002 | Moshal et al. | 345/440 |
| 2002/0116185 A1 | * | 8/2002 | Cooper et al. | 704/231 |

FOREIGN PATENT DOCUMENTS

| | | |
|---|---|---|
| EP | 0818925 A2 | 1/1998 |
| JP | 57107663 A | 7/1982 |
| JP | 2000270059 A | 9/2000 |
| JP | 2001268257 A | 9/2001 |
| WO | WO 00/44173 A1 | 7/2000 |

OTHER PUBLICATIONS

Taivalsari, Antero, "The Event Horizon User Interface Model for Small Devices," SMLI TR-99-74, Sun Microsystems, Palo Alto, California, Mar. 1999.

* cited by examiner

Primary Examiner—Raymond J. Bayerl
Assistant Examiner—Anita Datta Chaudhuri
(74) Attorney, Agent, or Firm—Banner & Witcoff, Ltd.

(57) ABSTRACT

A user's communication log for an electronic device, comprising: a first visual reference marker representing the current time; a second visual reference marker representing a past communication between the user and a third party; wherein the distance between the first and second visual reference markers increases as time goes by. The first visual reference marker is the origin of the circle about which the second visual reference marker is positioned at different angular positions.

6 Claims, 7 Drawing Sheets

| BUCK CHIPCHASE | |
|---|---|
| 📱 | 090 63635555 |
| 🏠 | 03 555563363 |
| ▥ | 03 55635563 |
| 🖱 | BUCK.CHIPCHASE@NOKIA.COM |
| 🖱 | BUCK.CHIPCHASE@AOL.COM |

| | | | | |
|---|---|---|---|---|
| Buck Chipchase | Out | | 17:53 | 1 March |
| Arthur Daley | Out | | 08:07 | 10 January |
| Rosco P Coltrane | In | | 03:07 | 13 March |
| John Blackthorne | In | | 09:45 | 19 March |
| Withnail | Out | | 09:48 | 19 March |
| Nishida Hikari | In | | 10:30 | 19 March |

COMMUNICATION LOG FOR AN ELECTRONIC DEVICE

CROSS-REFERENCE TO RELATED APPLICATION

The present invention claims the priority of United Kingdom application 0131042.4, filed on Dec. 28, 2001.

The present invention relates to a communication log for an electronic device.

Most people living in the modern world have a sizeable network of social and business contacts with whom they regularly interact. Increasingly, some part at least of this interaction takes place remotely over telecommunication infrastructure via a mobile phone, by voice or email, or a desktop PC by email.

The present invention is concerned with keeping track of these interactions.

With this in mind, according to one aspect of the invention, the present invention may provide a user's communication log for an electronic device, comprising:

a first visual reference marker representing the current time;

a second visual reference marker representing a past communication between the user and a third party;

wherein the distance between the first and second visual reference markers increases as time goes by.

By virtue of the present invention, the time elapsed since there was communication between the user and a third party is presented in an intuitive way.

Preferably, a plurality of second visual reference markers represent the last communication with a plurality of third parties. By virtue of this feature, an overall image of the latest communication with a group of contacts is provided.

In a preferred embodiment, the communication log is presented as contact circles. The first visual reference marker serves as the origin of the circle, and the second visual reference markers are positioned at different angular positions with respect to the origin. In this way, many different contact events can be presented in an uncluttered way simultaneously.

The communication log may further comprise an alert circle, the radius of which is set by the user. Once a second visual reference marker reaches this circle, an alert is made to the user indicating that a pre-chosen interval has elapsed since he had contact with the user corresponding to said second visual reference marker.

According to a second aspect, the present invention may provide a system for providing a communication log for a user's devices, comprising:

a first table of log entries, each entry relating to past communication between a first user device and a third party, and a first log controller;

a second table of log entries, each entry relating to a past communication between the second user device and a third party; and a second log controller;

wherein the first log controller is responsive to a command from the second log controller to send the first table of log entries to the first log controller, the first log controller being operable to compile an amalgamated table of log entries based on said first and second tables, and the system further comprising means, based on said amalgamated table, for providing a first visual reference marker representing the current time; and means for providing a second visual reference marker representing a past communication between the user and a third party, wherein the distance between the first and second visual reference markers increases as time goes by.

By synchronising the tables of log entries for the first and second user devices, the benefits of the first aspect of the invention can be fully enjoyed by the user when using more than one device.

According to another aspect of the invention, there may be provided a method of providing a communication log for a user which is synchronised between a plurality of user devices, by amalgamating the tables of local tables of log entries compiled at each device into a master table, and based on the master table, providing a first visual reference marker representing the current time; and providing a second visual reference marker representing a past communication between the user and a third party, wherein the distance between the first and second visual reference markers increases as time goes by.

Exemplary embodiments of the invention are hereinafter referred to with reference to the accompanying drawings, in which.

Figure 1:
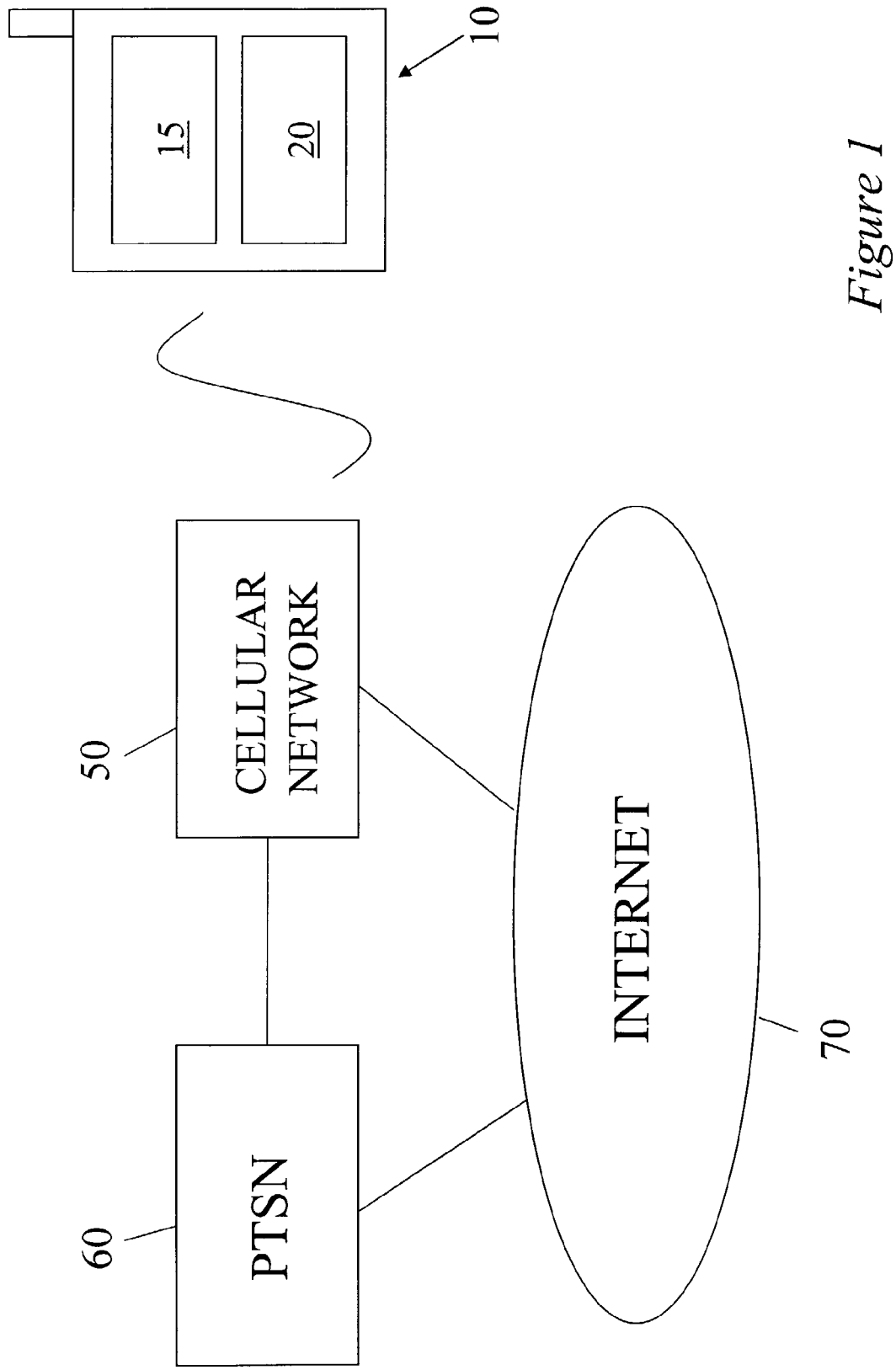
FIG. 1 shows a view of a first embodiment of the invention.
Figure 2:
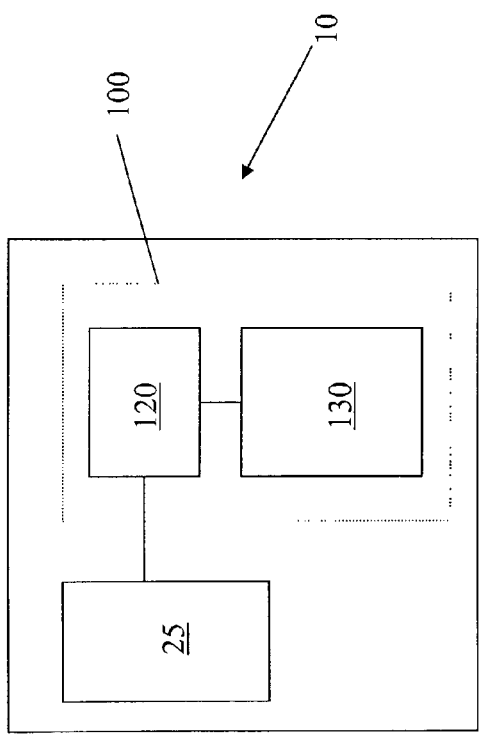
FIG. 2 shows a representation of some of the software modules in the cellular telephone of FIG. 1.
Figure 3:
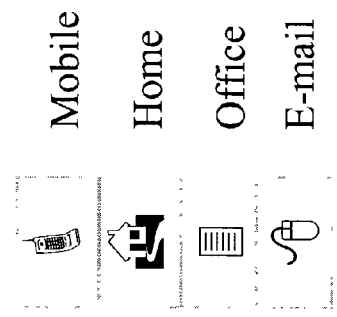
FIG. 3 shows a representation of a record for a single individual stored in the directory shown in FIG. 2.

Referring to FIG. 1, a communication device in accordance with a first embodiment of the invention is shown. The communication device is in the form of a mobile cellular telephone 10, and includes a display 15, and a keypad 20 for entering alphanumeric information. In a conventional fashion, the cellular telephone 10 can place and receive voice calls and SMS messages via a cellular network 50 and, as appropriate, via the Public Switching Telephone Network (PTSN) 60. Also, the telephone 10 is equipped with WAP or I-mode protocols and can send and receive emails via the cellular network 50 and the internet 70. The user enters the emails and SMS messages from the keypad 20. Referring to FIG. 2, the telephone 10 also comprises a directory 25. The structure of each record in the directory is such that the various telephone numbers and email addresses for a particular third party are associated. An example is shown in FIG. 3, in which, for a particular third party, each telephone number or email has with it associated an icon indicating it's nature, that is, which of a mobile telephone number, an office telephone number, a home telephone number, or an email address, it represents.

Figure 4:
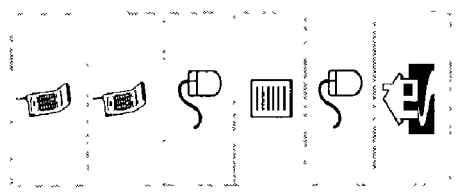
FIG. 4 shows a representation of a table listing past communications with the cellular telephone of FIG. 1.

Referring back to FIG. 2, the telephone 10 further comprises a user's communication log 100. The user's communication log 100 comprises a log controller 120, and a table of log entries 130. Each entry in the table 130 comprises a source/destination field 132; an event origin field 134 indicating whether the event originated at the telephone 10 or remotely; a communication category field 136; and a time field 138 indicating the time of the event. FIG. 4 shows an extract from an example table of log entries.

The log controller 120 based on incoming and outgoing communication traffic compiles the communication log 100. Notably, when an outgoing communication is initiated from the telephone 10, for example, as in the case of the call placed to the mobile telephone of "Buck Chipchase", the directory of the telephone is used to select the number and, therefore, the determination of the contents of the source/destination field 132 for the table 130 is performed by the user. In the case of an incoming communication, as in the case of for example the incoming telephone call from "Nishida Hikaru" or the incoming email from "Rosco P. Coltrane", the telephone makes a comparison with its directory in order to determine the contents of the source/destination field for 132 for the table 130. Although it is not shown in the examples, when, for an incoming communication, no match in the directory is found or, when, for an outgoing communication, the destination of the communication is entered manually and the directory not used, either the source/destination field can be filled with the telephone number/email address as appropriate, or the communication event can be discarded, depending on the type of user.

The log controller 120 can operate in a "last-contact-only" mode, in which an entry in the table 130 is replaced by a subsequent communication with the same third party. Or, the log controller 120 can operate in a "all-contact" mode in which a given third party can have multiple entries in the table 130. For the purposes of illustration, hereinafter, we shall discuss the "last-contact-only" mode of operation.

Figure 5:
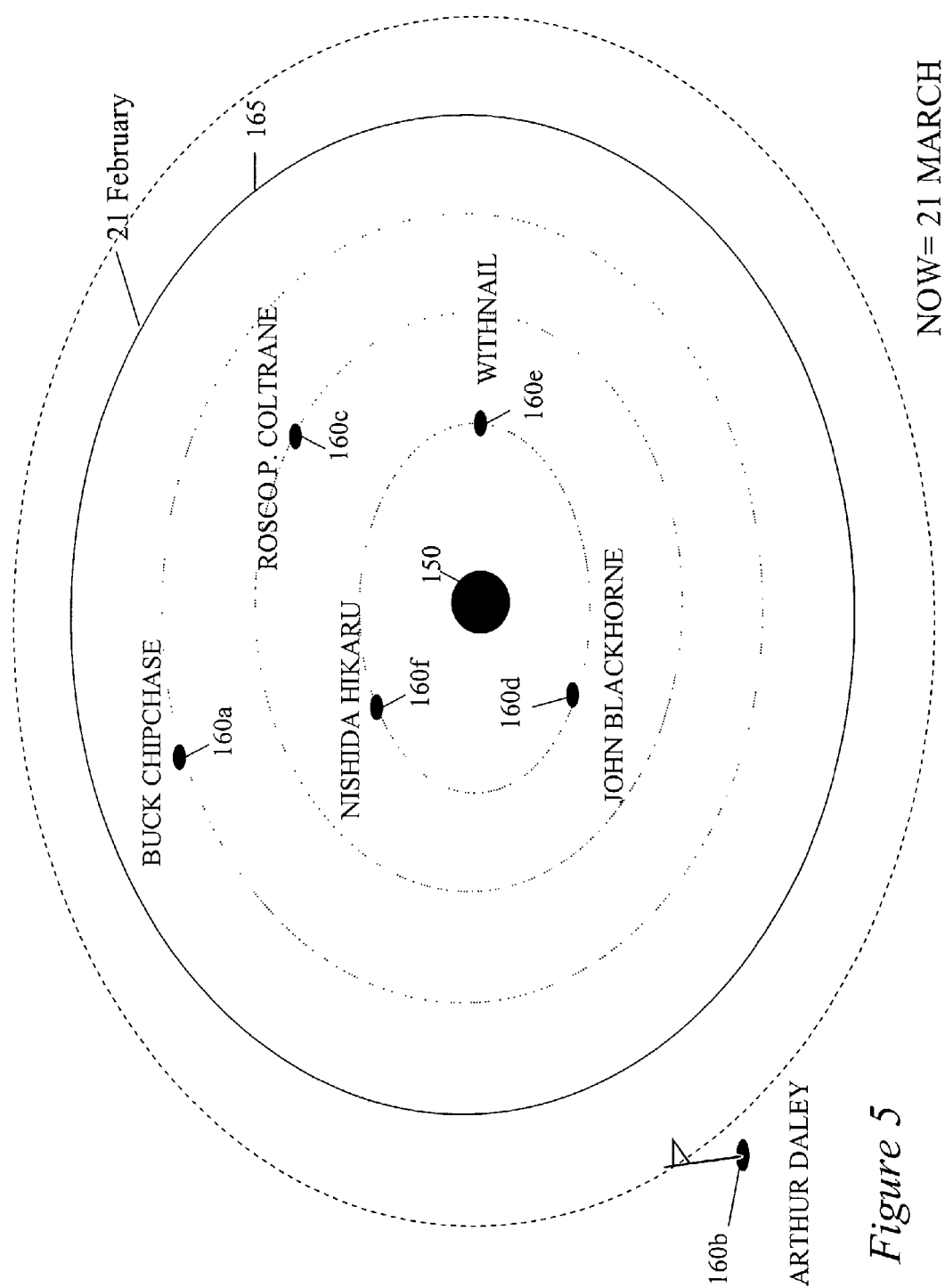
FIG. 5 shows an example output display in accordance with the invention.

When the user requests a communication history for the telephone 10, the data in the table of log entries 130 is displayed on the display 15 in the form of contact circles. A contact circle is defined by an origin which indicates the current time, and a point displaced from the origin by a distance related to the time which has elapsed since a communication took place. The locus of the circle, having a centre at the said origin, on which the point lies is called the contact circle. Referring to FIG. 5, a first visual reference marker 150 in the form of a large black dot is positioned at a central point in the display 15. The first visual reference marker 150 is the origin of the contact circles and represents the current time. In the example shown, the current time is the 21st March. Second visual reference markers 160a–f in the form of small dots and corresponding to the entries shown in the table 130, are positioned at various angular positions about the first visual reference marker 150. The distance between the first reference marker 150 and a second visual reference marker is related to the time that has elapsed since the communication corresponding to the given second visual reference marker 160 took place. By inspection of FIG. 5, it may be seen that communications with "John Blackthome", "Withnail", and "Nishida Hikaru" took place on 19th March, i.e. 2 days before, and so the second visual reference markers 160d,e,f are at different radial angles from the first visual reference marker, but at the same distance, corresponding to a period of 2 days, and therefore, occupy the same contact circle. The other communications in the table 130, represented by second visual reference markers 160a,b,c, having taken place earlier, are further displaced from the first visual reference marker 150, and thus occupy larger-radius contact circles. Thus, as time goes by without any contact, the second visual reference marker 160 continually drifts away from the first visual reference marker 150. Additionally, on, for example, receiving a email from a third party, let's say, Buck Chipchase, if the contact circles are viewed immediately thereafter, the second visual reference marker 160a, associated with him, will have moved backed to the origin, i.e. the position of the first visual reference marker 150.

Thus, it will be appreciated that by virtue of being represented in contact-circle form, the user is provided with a very intuitive and convenient snapshot of recent communication events.

The simplest algorithm for relating the elapsed time since the last communication to the displacement between the first and second visual reference markers 150,160, is to make the elapsed time proportional to the displacement. With some display devices, this may cause the problem that, depending on the proportionality relationship, either the time order of recent communications are not readily distinguishable from one another or the second visual reference markers tend to reach the extremities of the display too quickly. One solution to this is to related the "elapsed time" and the "displacement" in a more complex way, preferably by an algorithm which, for greater periods of elapsed time, requires a larger unit of time to elapse before a change of position of the second visual reference marker on the display results. Inevitably, when a long interval elapses, the second visual reference marker can be left at the furthest extreme of the screen. Alternatively, after a certain interval, it can be removed.

Referring to FIG. 5, the communication log further comprises an alert circle 165, the radius of which, and thus an interval of time, is set by the user. Once a second visual reference marker 160 reaches this circle, an alert is made to the user indicating that a pre-chosen interval has elapsed since he had contact with the user corresponding to said second visual reference marker. In the drawing, a flag has been placed on the second visual reference 160b to draw it to the attention of the user.

Figure 6:
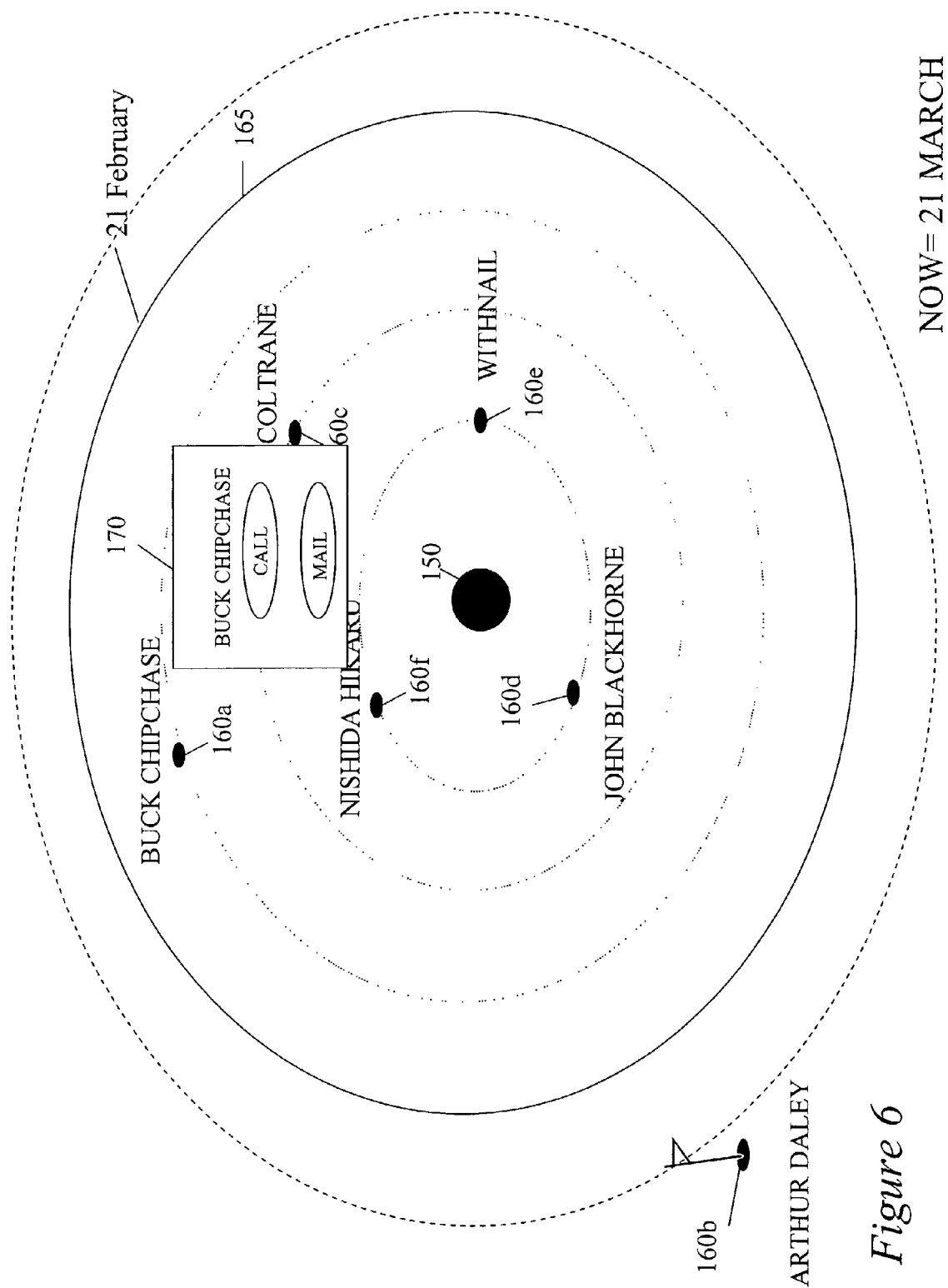
FIG. 6 shows another example output display in accordance with the invention.

Referring to FIG. 6, if the user wants to communicate with one of the third parties shown in the log 100, then he just has to click on the name and a dialogue box 170 will appear offering a choice of methods.

Although the second visual reference markers have been represented by simple dots, of course, depending on the graphical capabilities of the cellular terminal 10, more complex graphics can be used. For example, instead of dots, ship icons could be used on blue background, whereby over time, the ships would drift away from the origin 150, if there were no contact.

Instead of circles, other similar geometric configurations can be employed such an ellipse. Also, in accordance with the invention, the first visual reference marker may be a straight line, and each second visual reference marker travels along a locus defined by a line which is one of a set of parallel straight lines extending from the first visual marker.

In the first embodiment of the invention, the cellular telephone 10 serves as the central hub of all communications for the user and so the contact circles which are generated by the cellular telephone accurately reflect the overall communication history of the user. In practice, it is not always the case that this is so, and with this in mind, the second embodiment of the invention, hereinafter described, implement the present invention in a context where more than one device is used by user. Similar parts have been given the same reference numbers.

Figure 7:
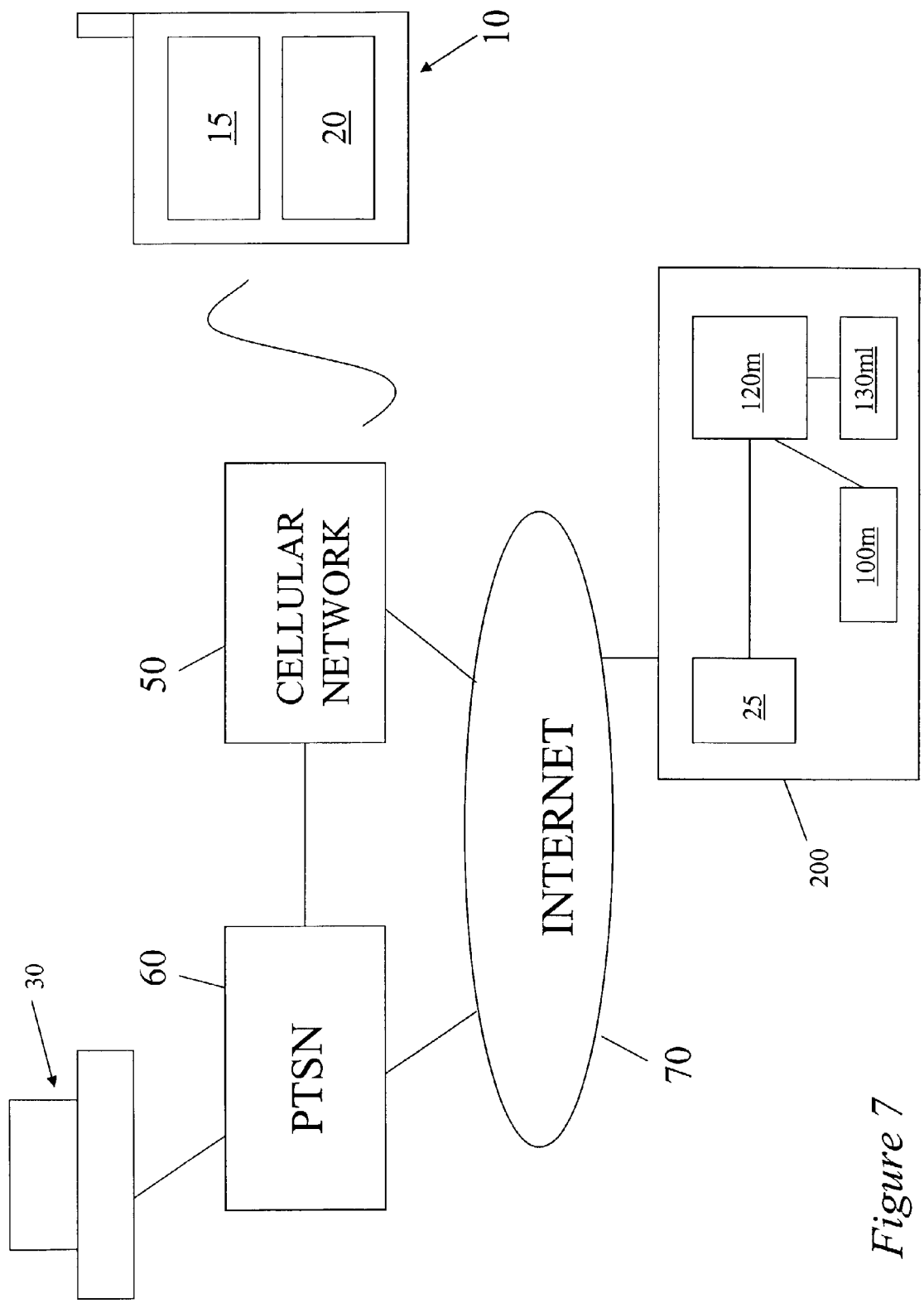
FIG. 7 shows a view of a second embodiment of the invention.

Referring to FIG. 7, in this embodiment, two user devices are shown. A first user device comprises the cellular telephone 10. Additionally, a second user device comprises a desktop personal computer (PC) 30.

Figure 8:
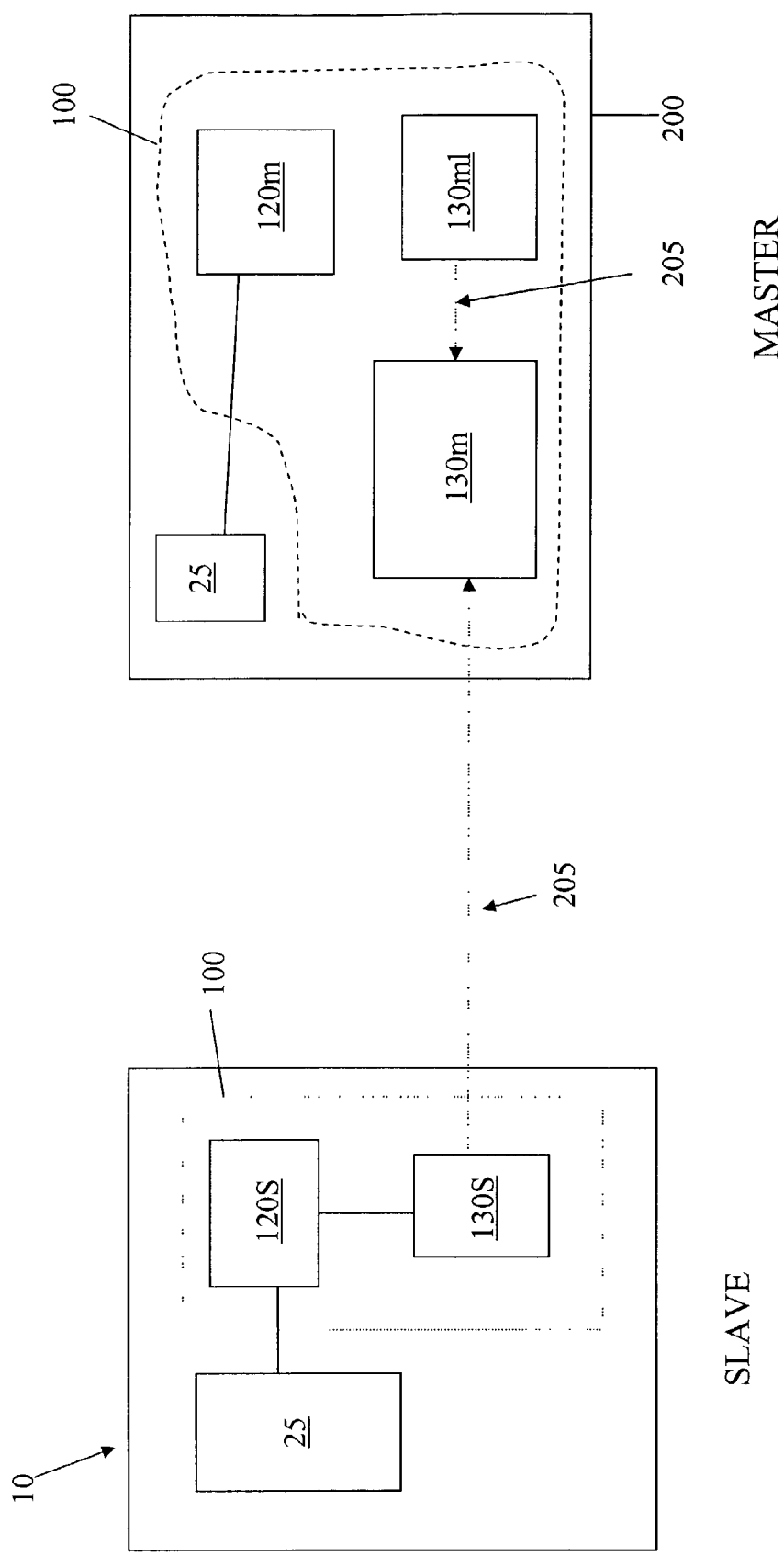
FIG. 8 shows a representation of some of the software modules running in some of the hardware in FIG. 7.

The cellular telephone 10 is largely the same as in the first embodiment except that it does not display the contact circles but only maintains a table of log entries based on incoming and outgoing communication traffic, and sends this data in response to an external request. Due to this difference in functionality, in this embodiment, the table of log entries for the cellular telephone 10 is designated 130s and the log controller is designated 120s as shown in FIG. 8.

The desktop 30 accesses the internet 70 via the PTSN 60, and is provided with many services by a server 200, which may be a major internet portal site, such as Yahoo!. In particular relation to this invention, the server 200 provides an email account. The server 200 comprises a log controller 120m, a table of local log entries 130ml. The table 130ml lists every communication event to and from the desktop 30. The server 200 also includes a master table of log entries 130m. The master table 130m comprises an amalgamation of the (slave) table 130s, and the local (master) table 130ml. The master table of log entries 100m is compiled in response to a request by the user to view the overall communication history, and in response thereto, the log controller 120m makes a request to the log controller 120s to upload the table 100s. On receipt thereof, the log controller 120m compiles the table 120m by amalgamating the tables 100s and 100ml, and then this information is displayed on the desktop 30 in contact circle form in the ways previously described in relation to the first embodiment. In this way, the contact circles corresponding to the complete communication history via both the cellular telephone 10 and the desktop PC can be displayed. It will be appreciated that in this embodiment that the desktop may be thought of as adopting the master role, in that it, via the server 200, initiates the complication of the overall table of log entries 130m, whereas the cellular telephone 10 may be thought of as operating as a slave as it is responsive to the commands of the log controller 120m. In other embodiments, the roles may be reversed and the cellular telephone 10 adopt the role of the master. The role of the slave can then be adopted by the server 200, or even the desktop PC itself, if the mail services and/or software for the communication log 100 are provided there.

By amalgamating the tables of log entries 120ml, 120s into a single table 120m reflecting the user's communication on both devices the benefits of the first aspect of the invention can be fully enjoyed by the user when using more than one device.

All the modifications and refinements discussed in relation to the first embodiment apply mutatis mutandis to the systems described in relation to the second embodiment.

The invention claimed is:

1. A user's communication log for an electronic device, comprising:
   a first visual reference marker representing the current time;
   a plurality of second visual reference markers representing past communications; and
   wherein the first visual reference marker is the origin of a circle about which the second visual reference markers are positioned at different angular positions, each distance between the first and second visual reference markers being dependent on the elapsed time between the past communication relating to each second visual reference marker and the current time.

2. A communication log as in claim 1, further comprising an alert circle, the radius of which is set by the user, wherein in response to a second visual reference reaching said circle, the user is alerted.

3. A communication log as in claim 2, further comprising a plurality of log entries, each entry relating to a past communication, and a log controller for calculating the distance between the first and second visual reference markers.

4. A communication log as in claim 1, further comprising a plurality of log entries, each entry relating to the past communication, and a log controller for calculating the distance between the first and second visual reference markers.

5. A system for providing a communication log for a user's devices, comprising: a first table of log entries, each entry relating to a past communication between a first user device and a third party; a first log controller; a second table of log entries, each entry relating to a past communication between a second user device and a third party; and a second log controller, wherein the first log controller is responsive to a command from the second log controller to send the first table of log entries to the first log controller, the first log controller being operable to compile an amalgamated table of log entries based on said first and second tables; means for providing a first visual marker representing the current time; means for providing a plurality of second visual reference markers representing past communications in the amalgamated log entries, wherein the first visual reference marker is the origin of a circle about which the second visual reference markers are positioned at different angular positions, each distance between the first and each of the second visual reference markers being dependent on the elapsed time between the past communication and the current time, wherein the distance between the first and second visual reference markers increases as time goes by.

6. A method of providing a communication log for a user that is synchronized between a plurality of user devices, comprising the steps of: amalgamating a plurality of device tables of log entries, compiled at each device, into a master table, and based on the master table, providing a first visual reference marker representing the current time; and providing a plurality of second visual reference markers representing the amalgamated log entries; wherein the first visual reference marker is the origin of a circle about which the second visual reference markers are positioned at different angular positions, the distance between the first and each of the second visual reference markers being dependent on the elapsed time between the past communication relating to each second visual reference marker and the current time.

* * * * *